United States Patent [19]

Trungold

[11] 4,164,164
[45] Aug. 14, 1979

[54] BOLT TENSION INDICATING MEANS

[76] Inventor: Emanuel H. Trungold, 14B Broun Place, Bronx, N.Y. 10475

[21] Appl. No.: 825,558

[22] Filed: Aug. 18, 1977

Related U.S. Application Data

[63] Continuation-in-part of Ser. No. 704,768, Jul. 13, 1976, abandoned.

[51] Int. Cl.² ............................................. F16B 31/02
[52] U.S. Cl. ........................................ 85/62; 85/50 R
[58] Field of Search ................... 85/50 R, 61, 62; 73/88 F; 151/34, 38, 46

[56] References Cited

U.S. PATENT DOCUMENTS

| | | | |
|---|---|---|---|
| 2,824,481 | 2/1958 | Johnson | 85/62 |
| 3,060,731 | 10/1962 | Adise | 85/62 |
| 3,104,645 | 9/1963 | Harrison | 85/62 |
| 3,153,974 | 10/1964 | Canning | 85/62 |
| 3,285,120 | 11/1966 | Kartiala | 85/62 |
| 3,383,974 | 5/1968 | Dahl | 85/62 |
| 3,495,907 | 2/1970 | Rogers | 85/50 R |
| 3,788,186 | 1/1974 | Crites | 85/62 |

*Primary Examiner*—J. Franklin Foss
*Attorney, Agent, or Firm*—Hubbell, Cohen, Stiefel & Gross

[57] ABSTRACT

Improved flat annular washer for indicating tension on associated high tensile strength bolt. Washer bears against either bolt head or nut of given radius. Washer includes means for indicating stress on washer which means is located a distance from center of washer at least equal to radius of bolt head or nut. Indicating means visibly moves when stress on washer, which is related to tensile stress on bolt, reaches a preselected level.

18 Claims, 20 Drawing Figures

U.S. Patent Aug. 14, 1979 Sheet 1 of 2 4,164,164
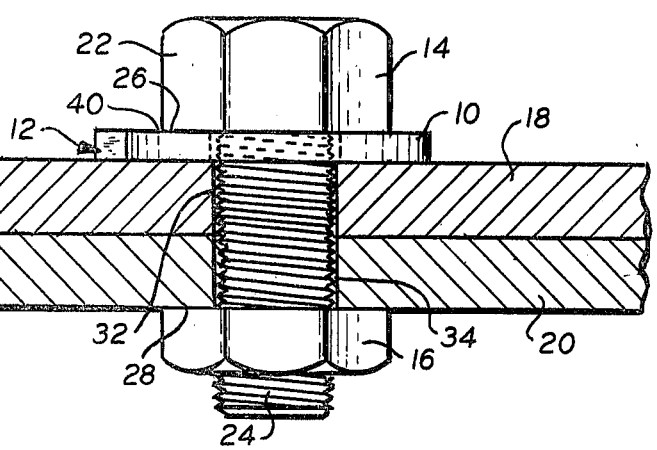
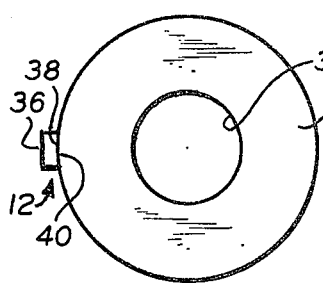
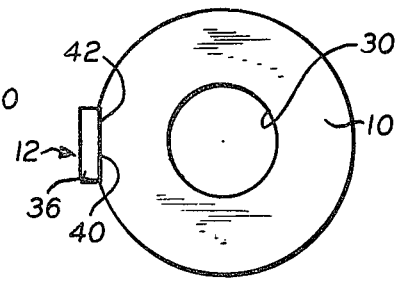
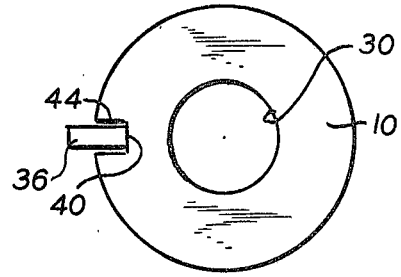
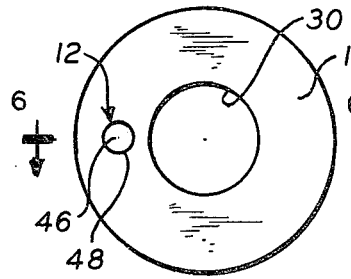
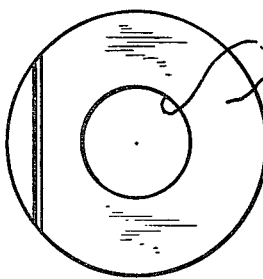
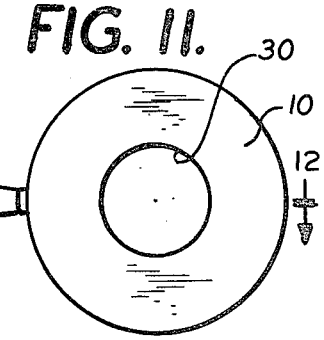
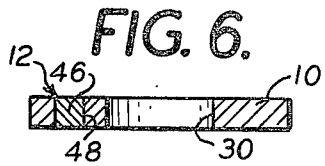
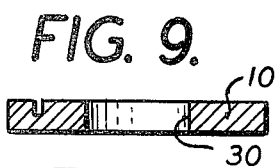
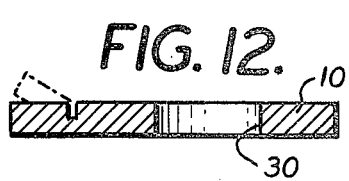
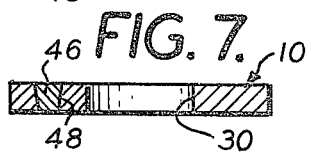
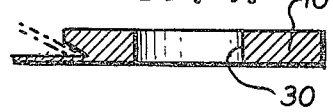
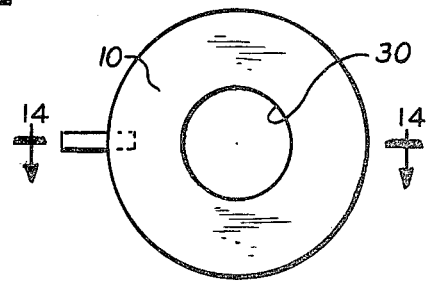

BOLT TENSION INDICATING MEANS

CROSS-REFERENCES TO RELATED APPLICATIONS

This application is a continuation-in-part of application Ser. No. 704,768, filed on July 13, 1976 now abandoned.

BACKGROUND OF THE INVENTION

1. Field of the Invention

This invention relates to washers for high tensile strength nuts and bolts and particularly to washers having means for indicating when a predetermined tension has been realized on the bolt.

2. The Prior Art

The amount of tension in a high tensile strength bolt is a critical parameter in steel fabrication. If the bolt is not tight enough, then the joint of which the bolt is part will not be as strong as designed. On the other hand, if the bolt is overstressed, a potential future failure is built into the joint.

Among the most common techniques for determining the tension in a bolt is by the use of a wrench capable of delivering a certain torque, which torque is equated to a predetermined tension on the bolt. This common technique is recognized by everyone skilled in the art to be one that is highly variable in result due to significant variations in friction which could lead to requirements for high or low torque to twist a bolt at any predetermined actual tension. Thus, the correlation is rough and the indication can prove highly inaccurate. Such a method is described and its disadvantages are discussed in an article which appeared in the Mar. 6, 1975 issue of *Machine Design* at pages 78 to 82.

The deficiencies in a method of determining tension by measuring torque have been recognized for a very long time and there have been numerous attempts to provide ways of yielding a more direct technique for accomplishing this desirable end. Thus, in Seitz U.S. Pat. No. 2,394,812 granted on Feb. 12, 1946, it is proposed to provide such an indicating means by employing two nuts which are soldered together and then applying a wrench to one of the nuts, specifically the outer one, and tightening the two nuts until the torque on the nut actually engaged by the wrench becomes so great relative to the other nut that the solder is sheared. When the outer nut is thus severed from the inner, an indication of the bolt tension is given. The Seitz method has several aspects that have limited commercial realization. First, it requires two nuts which add to the cost. Secondly, the Seitz lock nut still relies on torque as an indication of bolt tension since it is the shear force resulting from torquing that will cause the shearing of the solder between the two nuts. This being so, the Seitz method is still an indirect method with all of the resulting shortcomings of the standard torque method.

In Lewis U.S. Pat. No. 3,174,386, a special washer is disclosed which yields a direct indication of bolt tension. This is accomplished by providing the washer with two flared out portions and a necked down center, which necked down center will actually collapse when the center in the bolt reaches a predetermined level. While Lewis thus gives a direct indication of bolt tension, rather than an indirect indication determined from torque, the Lewis washer tends to be costly to manufacture and the indicating portion is recessed between the bolt head and the adjacent plate and is not readily visible to the person applying bolt tension. Moreover, it requires soft steel which is contrary to acceptable modern practice of forming washers for high strength bolts from heat treated hardened steel.

It has been proposed to incorporate in bolt heads or in washers a variety of materials which change their optical properties, such as color or plane of polarization, when subjected to certain minimum amounts of tension. For example, reference may be had to the Grikscheit et al U.S. Pat. Nos. 3,224,316 and 3,495,907. However, to the best of applicant's knowledge, such optical indicating means have not achieved any degree of commercial success, partly due to the inclusion of soft optical materials therein.

In Velthoven U.S. Pat. No. 3,783,734, it is proposed to use a specially designed washer in conjunction with a specially designed nut or bolt head which cooperates to cause a frangible piece of the specially designed washer to break off when a predetermined tension is achieved in the bolt. The specially designed nut or bolt head, however, requires a reduction in the bearing surface provided by said nut or bolt head, thereby to reducing the effective tension capable of being handled by said nut or bolt.

In Crites U.S. Pat. No. 3,788,186, a stress indicating means is described which provides for the incorporation of a frangible insert in the head of a bolt or on a washer, which frangible insert will break when a tension of certain proportions is achieved in the bolt. In the usual tightening of such a bolt by a socket wrench, the socket covers and therefore conceals the indicating element during the course of tightening. Also, the Belleville type washer is not allowed by most Codes for use with high tensile bolts.

There are a number of commercially available washers presently on the market which do yield direct indications of bolt tension. Thus, for example, there is a four-piece washer assembly termed "preload indicating washer" that is manufactured by The Standard Pressed Steel Company which is described in a publication entitled *Fasteners Handbook* at page 278. This same washer assembly is described in the aforementioned article in *Machine Design* at page 81. In addition, the Illinois Tool Works, Inc. markets a so-called "square cone washer" which is apparently described in U.S. Pat. No. 3,628,584. Additionally, Cooper & Turner, Inc. and Bethlehem Steel Company both market a load indicator washer each of which is apparently described in U.S. Pat. No. 3,187,621 which is owned by Cooper & Turner, Inc. However, all three of these commercially available washers yield an indication that is not readily visible and often requires a gauge or the like in order to determine precisely what is being indicated by them. The "square cone washer" is essentially a Belleville type washer with the same objections cited for Crites. The Bethlehem washer does not provide full bearing between the undersurface of the nut or bolt and the top of the washer. In high heat applications this could lead to a relaxation of bolt tension.

BRIEF DESCRIPTION OF THE DRAWINGS

In the drawings:

FIG. 1 is a view partly in section and partly in elevation showing a washer embodying the present invention in connection with a nut and bolt that are employed to connect two plates together;

FIG. 2 is a plan view of the washer shown in FIG. 1;

FIG. 3 is a plan view of a modified form of washer shown in FIG. 1;

FIG. 4 is a plan view showing yet another modification of the washer shown in FIG. 1;

FIG. 5 is a plan view of another washer embodying the present invention;

FIG. 6 is a sectional view taken along the line of 6—6 in FIG. 5;

FIG. 7 is a sectional view similar to FIG. 6 but showing a modified form of washer;

FIG. 8 is a plan view of yet another washer embodying the present invention;

FIG. 9 is a sectional view taken along the line 9—9 of FIG. 8;

FIG. 10 is a view similar to FIG. 9, but showing the tab deformed to thus indicate that the preselected tension has been achieved;

FIG. 11 is a plan view of yet another form of washer embodying the present invention;

FIG. 12 is a sectional view taken along the line 12—12 in FIG. 11;

FIG. 13 is a plan view of still a further modification;

FIG. 14 is a sectional view taken along the line 14—14 of FIG. 13;

DETAILED DESCRIPTION OF THE PREFERRED EMBODIMENT

Figure 15:
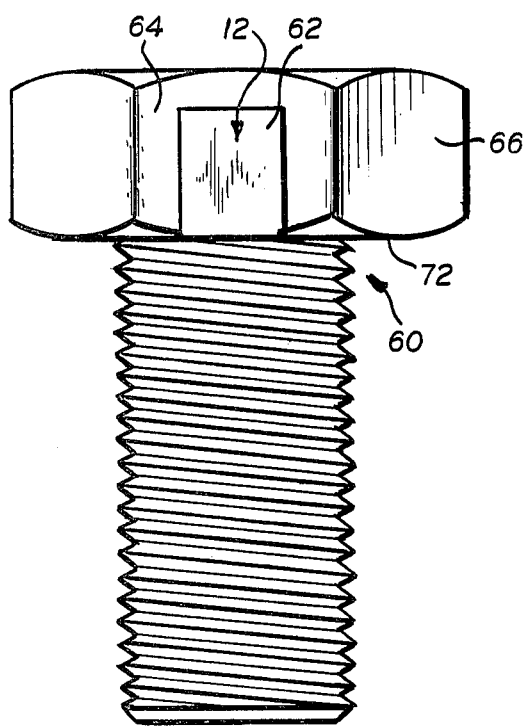
FIG. 15 is a view in elevation showing a bolt embodying the present invention.

Referring now to the drawings in detail and particularly to FIGS. 1 and 2 thereof, a washer 10 which incorporates a tension indicating means 12 is shown in combination with a high tension bolt 14 and its cooperating nut 16 which serve to join two structural elements here shown by way of illustration to be plates 18 and 20. The high tensile strength bolt 14 is of conventional design, here shown by way of illustration to have a castellated hexagonal head 22 and a threaded shank 24 which between them define a bearing surface 26. The nut 16 is of similar hexagonal castellated configuration for the purposes of illustration and is shown to have approximately the same diameter as the bolt head 22. Thus, the annular bearing surface 28 defined by the nut 16 is substantially equal in area to the bearing surface 26. As is common, and as is preferred, the annular surface of the washer 10 is greater than the annular bearing surfaces 26 and 28. In general, the aperture 30 in the washer 10 is of about the same diameter as the aligned apertures 32 and 34 in the plates 18 and 20.

Save for the inclusion of the bolt tension indicating means 12 on the washer 10, the arrangement heretofore described and illustrated in FIG. 1 is wholly conventional and well known in the art. The materials from which the various components are made may be any suitable materials, although it is obvious to the skilled art worker that the major practical application for this invention lies in steel construction wherein the bolt, washer, nut and plates are all made of steel, the bolt and nut being made of a high tensile strength steel.

As indicated, the present invention resides in the incorporation in the washer 10 of a novel means for indicating the tension on the bolt 14. It will be clear from a perusal of FIG. 1 that as the tensile stress in the bolt 14 increases, the compressive stress on the washer 10 increases concomittantly. This being the case, if a tab 36, here shown of essentially rectangular configuration, but with an arcuate surface 38 complementary to the surface of the washer 10, is glued to the periphery of the washer 10 with the arcuate surface 38 in confronting relation with said washer periphery, the tab 36 will be subjected to an upward force that will be dependent upon the tension in the bolt 14 and not on torque nor on any other parameter. Assuming the adhesive employed to join the tab 36 to the washer periphery has a well known and well defined shear strength and since the area of the adhesive joint will be known, that joint will fail when a predetermined upward force is applied to the bottom of the tab 36 which induces the necessary stress in the glue joint to fracture that joint. By selection of the area of the joint and the kind of glue, washers may be constructed wherein the joint will be fractured when a predetermined minimum tension is achieved in the bolt 14, which fracturing will result in the tab 36 falling away from the washer 10.

In this connection, it is important to note that the tab 36 extends beyond the periphery of the bolt head 22 and of the wrench torquing the bolt, whereby to yield a very easily viewed indication of tension that does not require anything more than mere visual inspection. This overcomes some of the shortcomings in the prior art arrangements wherein guages or feelers or the like had to be employed to achieve the necessary information.

The nature of the material of the tab 36 may be any suitable material, preferably brightly colored for easy visibility and possibly color coded as to stress. However, it must have sufficient strength to resist the stress that will be induced at the point where the glue joint 40 fails. For convenience sake, the tab 36 is generally made of the same material as the washer 10. The adhesive employed may be any suitable adhesive for binding the material of the tab 36 to the material of the washer 10 which has sufficient strength to withstand failure until the bolt is properly tensioned. There are numerous suitable glues for use in this invention and one which has been satisfactorily employed in my experiments has been an anaerobic adhesive sold under the name "Loctite", which adhesive is very quick setting, exhibits a well defined and sufficiently great ultimate shear stress and readily bonds a large number of similar and dissimilar materials including, for instance, hardened steel.

While washer 10 is shown bearing against the bolt head 22, it may be employed equally effectively in bearing relation with nut 16 as well. Thus, in all previous and subsequent description, this alternative use will be recognized as existing and being practicable.

Referring now to FIG. 3, the washer 10 of that drawing is identical to the washer of FIGS. 1 and 2 save for the fact that the tab 36 is of a true rectangular configuration and the periphery of the washer 10 confronting the tab 36 is flattened as at 42 to define a suitable complementary surface to make a flat glue joint 40. However, it will be seen that the tab 36 of FIG. 3 extends beyond the periphery of the bolt head 22 and will be snapped off when the bolt is subjected to a predetermined tension, whereby to render a readily visible indication that a certain tension has been realized.

Turning now to FIG. 4, yet another modified form of washer 10 is shown which operates on the same principle as the washers of FIGS. 2 and 3. While it is generally found that the compressive force on the washer 10 is approximately equally distributed over the entire bearing surface, there may be some tendency for that stress to be concentrated nearer the center of the washer 10 than at the periphery. Thus, if higher stress levels are deemed desirable for the use with this invention, the tab 36 may be secured by a glue joint 40 inset from the outer periphery of the washer 10 by cutting a notch 44 in the washer to permit the tab 36 to extend inwardly from the outer edge thereof.

Referring now to FIGS. 5 and 6, still another modified form of washer 10 is shown, wherein the tension indicating means 12 comprises a cylindrical plug 46 glued into a complementary aperture 48 in the washer 10. Clearly, the washer 10 must be proportioned so that the outer perimeter extends beyond the perimeter of the bolt head 22 a sufficient degree so that the plug 46 is clear of the bolt head (or the nut if in bearing relation therewith). As the bolt is tightened, there will be an upward force on the lower surface of the washer 10, which force will press the plug 46 upwardly. When a predetermined upward force on the plug is reached, which force will be directly correlated to the tension on the bolt 14, the plug will pop loose.

Assuming the plug 46 is a straight wall cylinder, it might be somewhat difficult to determine that the adhesive bond holding it in the aperture 48 has been broken. To overcome this problem, a modified form of washer 10 is shown in FIG. 7 which is in all respects identical to the washer of FIGS. 5 and 6 save for the fact that the plug 46 is made of an elastomeric material such as, for example, rubber or the like, and is frustoconical in configuration. When the frustoconical plug 46 of FIG. 7 is inserted in a complementary shaped aperture 48, and the washer 10 resulting therefrom is employed in the manner of the washers previously described, as the stress on the bottom of the frustoconical plug 46 increases in accordance with the tension on the bolt 14, the glue joint between the plug and the aperture wall will finally fail. However, prior to failure, there will be considerable strain in the plug 46 so that when the plug is freed from the washer by the failure of the glue joint, the plug will literally pop out of the washer. This will give an easily seen visual indication that minimum tension on the bolt has been achieved.

While it is presently preferred to obtain the indication of bolt tensile stress by relying on the failure of a glue joint as heretofore described in connection with FIGS. 1 to 7, other means may be employed for yielding the indication of bolt tension. One such means is illustrated in FIGS. 8 and 9, wherein the washer 10 is provided with means 12 for indicating tension, which means is in the form of a tab 50 integral with the balance of the washer, but joined thereto by a section 52 of diminished thickness as a result of the slot 54 in the washer 10. Assuming the washer of FIGS. 8 and 9 is employed with a bolt having a head whose radius does not exceed the radius "r" in FIG. 8, (i.e. the normal distance between the slot 54 and the center of the washer 10), as the bolt is tightened, the upper force on the washer will finally cause the tab 50 to flex upwardly as shown in FIG. 10 to give a visual indication that the predetermined tension has been reached on the bolt. The flexing is caused by a yielding of the washer at section 52 where the unit stress will be very high.

Referring now to FIGS. 11 and 12, a modified washer 10 similar to that of FIGS. 8 to 10 is shown. In the washer 10 of FIGS. 11 and 12, the washer diameter is preferably substantially equal to or perhaps slightly greater than the diameter of the head 22 of the bolt 14 (or the nut 16) with which it is employed. A tab 50 extends radially outwardly from the periphery of the washer 10, it being joined thereto by a thin portion 52 which is defined by a slot 54 in the upper surface of the washer. The operation of the washer of FIGS. 11 and 12 is identical to that of the washer of FIGS. 8 to 10 with the flexed tab 50 being shown in solid lines in FIG. 12 in its unstressed condition and being shown in dotted lines in FIG. 12 in the position which it will assume when the predetermined tension has been reached. Since the tab 50 extends beyond the outer periphery of the bolt head, the flexing of the tab 50 will not be interfered with by the bolt and it will be readily visible to the worker applying tension to the bolt.

Turning now to FIGS. 13 and 14, yet another form of washer with tension indication means 12 is shown. The washer 10 of FIGS. 13 and 14 is essentially a circular disc-shaped washer with the diameter of the washer being approximately equal to the diameter of the bolt head (or nut) with which it is to be employed. However, provided in the lower surface of the washer 10 of FIGS. 13 and 14 at the outer marginal portion thereof is a radial slot 56 which is complementary to the inner portion of a leaf spring 58 that is adapted to extend beyond the outer periphery of the washer 10. The lower surface of spring 58 is coplanar with the lower surface of washer 10. The upper surface of the slot 56 is upwardly chamfered or slanted as it approaches the outer edge of the washer, whereby to provide room for flexing of the spring 58 from a solid line or unstressed position in FIG. 14 to a dotted line or stressed position in that figure. When the washer 10 of FIGS. 13 and 14 is associated with a bolt having a head with a diameter no greater than the diameter of the washer and the bolt is tightened, the upward force on the lower surface of the bolt which is related to the tension of the bolt will finally become sufficiently great to cause the leaf spring to flex upwardly, which upward flexing will not be interfered with by the bolt because of the proportioning of the bolt and the washer. The upper chamfering of the slot 56 is designed also to permit a greater degree of flex of the spring, whereby to give a greater visual indication beyond the outer edge of the washer and bolt. Clearly, the spring 58 can be fixed to the slot 56 by any suitable manner such as, adhesives, solder or, preferably, by welding or the like.

In each of the embodiments of the invention described herein, it will be seen that a tension indicating means 12 is provided, which means extends beyond the outer edge of the head of the bolt whose tension is being measured or of the nut securing the bolt and which means will move as by breaking away or flexing to thus give a clear visual indication that the bolt tension has reached a prescribed minimum level. At that point, the tightening of the bolt can stop.

Of course, if desired, a plurality of means 12 may be affixed to a single washer 10, each of which of the means 12 may be arranged to give a visual indication at a different bolt tension. Thus, as the tension on the bolt is increased, the worker will receive a series of visual indications of the tension on the bolt and can stop when he reaches the desired tension. This multiple indication washer is clearly within the scope of the present invention.

It will be apparent to one skilled in the art that the tension indicating means 12 of the variety of forms hereinbefore described need not necessarily be incorporated in a washer 10. Instead, if desired, such means could be incorporated into the head of a high tension bolt 14 adjacent its bearing surface or into a nut 16 adjacent its bearing surface. While it is believed preferable to incorporate means 12 into washers, it will be apparent that the invention will function as well in either of these other environments.

Figure 16:
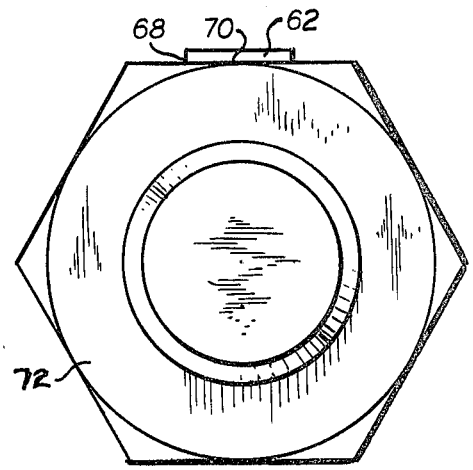
FIG. 16 is a bottom plan view of the bolt shown in FIG. 15.

For example, referring first to FIGS. 15 and 16, indicating means 12 is incorporated in bolt 60. As shown, indicating means 12 comprises a tab 62 which is affixed to one face 64 of bolt head 66 by glue joint 68 such that one edge surface 70 of the tab 62 is flush with the bearing surface 72 of the bolt. As presently preferred, tab 62 is comprised of carbon steel. The adhesive employed in affixing the tab to the face 64 may be any of those more fully described above with reference to FIGS. 1–14.

The operation of the embodiment of FIGS. 15 and 16 is essentially the same as that of FIGS. 1–14. Thus, as bolt 60 is tightened, tab 62 will shear from face 64 when the shearing forces transmitted through edge surface 70 exceed the strength of glue joints 68.

Skilled art workers will recognize that when this embodiment is employed, an open-end wrench, as opposed to a socket-type wrench, should be employed in order that shearing of tab 62, which indicates that the appropriate bolt tension has been achieved, will be readily visible to the user. However, it will be apparent to those skilled in the art that the use of either a socket wrench having a window or an L-shaped tab would avoid this limitation.

Figure 17:
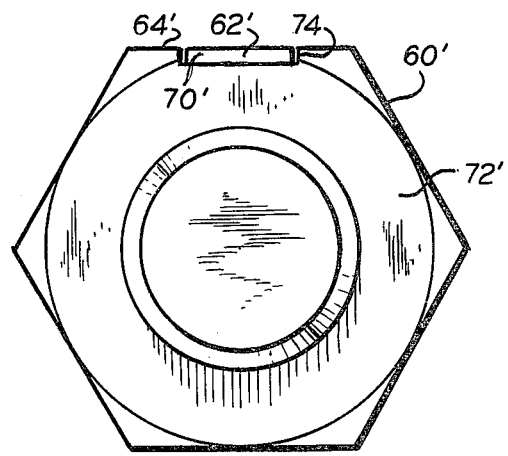
FIG. 17 is a view similar to FIG. 16 but showing a modification of the embodiments of FIGS. 15-16.

A modification of the embodiment depicted in FIGS. 15 and 16 is illustrated in FIG. 17 wherein the face 64' of bolt 60' to which tab 62' is affixed is recessed as shown at 74. As shown, tab 62' is disposed in recess 74 such that edge portion 70' is flush with the bearing surface 72' of bolt 60' and the radially outward face of tab 62' is recessed from surface 64'. This embodiment is advantageous insofar as it permits an open-end type wrench to be disposed about bolt face 64' without risking accidental shearing of tab 62'. Since, edge surface 70' is preferably about 0.01 inches thick, recess 74, which need only be slightly greater than this dimension, may be easily accommodated in a conventional bolt head.

When this embodiment is employed, tab 62' will preferably be affixed solely to the rear wall of the recess 74 and so dimensioned that the sides of the tab are spaced from the radially extending walls of the recess. This insures that frictional forces will not increase the level of the shear force needed to shear adhesive joint 68'.

It will be apparent that the embodiments shown in FIGS. 15–17 will work equally well whether the bearing surface 72 of the bolt 60 confronts a washer or one of the structural elements to be joined.

Figure 18:
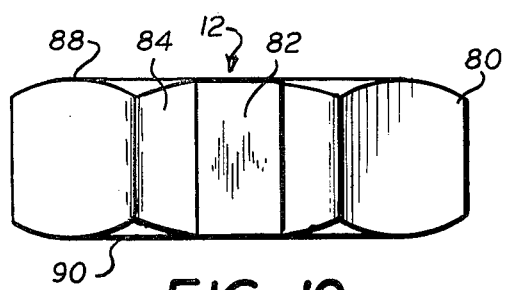
FIG. 18 is a view in elevation showing a nut embodying the present invention.
Figure 19:
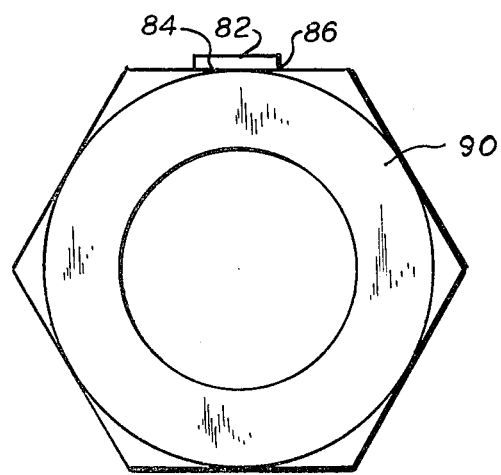
FIG. 19 is a bottom plan view of the washer shown in FIG. 18.

Referring now to FIGS. 18 and 19, a further modification is shown wherein indicating means 12 is incorporated in a conventional hexagonal nut 80. As shown, indicating means 12 comprises a tab 82 which is secured to one face 84 of nut 80 by a suitable glue joint 86 of the type more fully described above. As best shown in FIG. 18, the upper and lower edge surfaces of the tab 82 are preferably flush with the upper and lower bearing surfaces 88, 90 of nut 80, respectively. Skilled art workers will recognize that this permits "reversible" use of nut 80 and its associated indicating means.

Based on the foregoing description, functioning of the indicating means 12 depicted in FIGS. 18 and 19 will be apparent. Thus, depending on the predetermined strength of the glue joint 86, sufficient pressure will eventually be transmitted through the bearing surface of the nut 80 to shear the tab 82 from the face 84, thus indicating that the appropriate bolt tension has been achieved.

Figure 20:
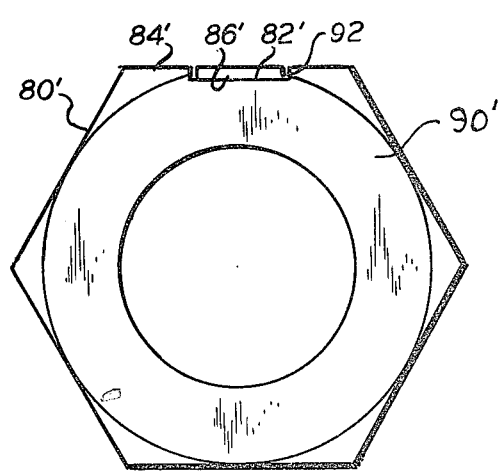
FIG. 20 is a view similar to FIG. 19 but showing a modification of the embodiments of FIGS. 18-19.

Referring to FIG. 20, which is analogous to FIG. 17, tab 82' is shown disposed in a recess 92 in one face 84' of nut 80'. As shown, the surface of tab 82' which confronts the rear defining wall of recess 92 is affixed thereto by a suitable adhesive joint 86'. For the reasons described above, the height of tab 82' will desirably be equal to that of nut 80' such that the upper and lower edge portions thereof are flush with the upper and lower bearing surfaces of nut 80', respectively, thereby permitting "reversible" use.

The funtioning of the embodiment of FIG. 20 is identical to that of FIGS. 18 and 19, i.e., tab 82' will shear from face 84' when the pressure transmitted to the tab via its bearing surface is sufficient to shear glue joint 86'. While the embodiment of FIG. 20 requires the provision of a recess in one face of the nut 80', it is preferable inasmuch as it permits an open end type wrench to be disposed about the face 84' without risking accidental shearing of tab 82'.

It will be appreciated by those skilled in the art that while bolt head 66 and nut 80 are depicted as hexagonal, other shapes, such as square or even circular nuts and bolt heads may also be advantageously employed. In fact, it will be apparent from the foregoing, that suitable indicating means 12 could be incorporated in a wing nut. Moreover, skilled art workers will recognize that the various other indicating means illustrated in FIGS. 1–14 for use with a washer could also be incorporated in a nut or bolt head. Furthermore, additional tabs may be affixed to the other faces of the nut or bolt head by glue joints of varying strengths whereby a single nut or bolt will be capable of providing indication of a variety of bolt tensions. Additionally, while the embodiments of FIGS. 15–20 have depicted the tab as being disposed such that one edge surface of the tab comprises the bearing surface thereof, this is not necessary and an embodiment wherein an edge surface of the tab is glued to the face of the bolt with the tab extending radially outward therefrom could also be advantageously employed. However, this embodiment is not preferred inasmuch as it is not well suited for use with conventional nut and bolt tightening means.

While the tabs 36 of the various embodiments are shown to be flat with their bearing surfaces coplanar with the bearing surface of the washer 10, it is within the contemplation of the present invention that only a portion of such tab surface be coplanar with the bearing surface of the washer, particularly the portion closest to the washer body. Such shaping of the bearing surface (to render a portion of it non-bearing) might be necessitated to balance the strength of the glue joint holding the tab and the compressive stress set up in the tab prior to failure.

It will be recognized that as used herein the term "adhesive" is intended to include all suitable adhesives, solders or other bonding material which can function as described hereinbefore.

Any one of the washers 10 described hereinbefore may be employed in association with a pneumatic or electric torque wrench such that the indicating means 12 may be operatively connected to a suitable signal producing mechanism to provide a signal input for the wrench to stop the operation of the wrench when the means 12 indicates that the prescribed tension has been achieved. Clearly, a simple electric or pneumatic servo system can be employed in this manner once it is recognized that the washer 10 is available to the skilled art worker for such use.

Irrespective of the form of the invention employed herein, it will be apparent to anyone of ordinary skill that the incorporation of my stress indicating means in any of its forms will not render the washer (or nut or bolt) non-compliant with current codes and, thus, it will not be necessary to effect amendments to such codes to bring about commercialization of the invention hereinbefore described in all of its forms.

While I have herein shown and described the preferred form of the present invention and have suggested a variety of modifications therein, other changes and modifications may be made therein within the scope of the appended claims without departing from the spirit and scope of this invention.

I claim:

1. In a bolt assembly of the type including as assembly components a bolt having a bolt head and stem, and a nut threadably engageable with said bolt stem, an improvement which comprises means for indicating that the stress on the bolt has reached a preselected level, said indicating means comprising an element located on one of said assembly components with one surface of the element coplanar with a bearing surface on said one component, the element being joined to said one component by adhesive having a predetermined stress failure which is reached when the bolt achieves said preselected stress level, whereby when the bolt is stressed to said preselected level, the adhesive joint fails thereby effecting movement of the element relative to said one component.

2. The bolt assembly of claim 1, and further comprising a washer disposable on said bolt stem between said nut and said bolt head, said washer comprising an additional assembly component.

3. The bolt assembly of claim 2, wherein said one assembly component is said washer and said element is located on said washer a distance from the center thereof not less than the radius of said nut or bolt head.

4. The bolt assembly of claim 3, wherein said element is a tab.

5. The bolt assembly of claim 4, wherein said tab has an arcuate surface complementary to the outer peripheral surface of said washer, and said adhesive joint is located between said washer outer periphery and the arcuate surface of said tab.

6. The bolt assembly of claim 4, wherein said tab has a flat surface, and the outer peripheral surface of said washer includes a flat portion, and said adhesive joint is between said tab flat surface and said flat portion of said washer peripheral surface.

7. The bolt assembly of claim 4, wherein said washer is provided with an inwardly extending notch in the periphery thereof, and said tab is disposed partly within said notch and partly without, and said adhesive joint is located at the inner end of said notch.

8. The bolt assembly of claim 3, wherein said element is a plug, and said washer is provided with an axial hole complementary to said plug, said plug being disposed in said hole, and wherein said adhesive joint is between said plug and the wall of said hole.

9. The bolt assembly of claim 8, wherein said plug and said hole are cylindrical.

10. The bolt assembly of claim 6, wherein said plug and said hole are frustoconical.

11. The bolt assembly of claim 10, wherein said plug is made of elastomeric material.

12. The bolt assembly of claim 1, wherein said one assembly component is said bolt, said element is located on said bolt head, and said one element surface is coplanar with the surface of said bolt head from which said bolt stem extends.

13. The bolt assembly of claim 12, wherein a radially outward surface of said bolt head is provided with an axially extending recess, and said element is completely received within said recess.

14. The bolt assembly of claim 13, wherein said element comprises a tab, said one surface is an edge surface of said tab and wherein one other surface of said tab confronts the rear defining wall of said recess and said adhesive joint is between said one other tab surface and said rear defining wall.

15. The bolt assembly of claim 1, wherein said one assembly component is said nut.

16. The bolt assembly of claim 15, wherein a radially outward surface of said nut is provided with an axially extending recess and said element is completely received within said recess.

17. The bolt assembly of claim 16, wherein said element comprises a tab, said one surface is an edge surface of said tab and wherein one other surface of said tab confronts the rear defining wall of said recess and said adhesive joint is between said one other tab surface and said rear defining wall.

18. The bolt assembly of claim 17, wherein said nut is annular in shape and the edge surface of said tab opposite said one edge surface is flush with the bearing surface of said nut opposite said first-mentioned bearing surface.

* * * * *